Sept. 10, 1963   L. W. PARKER   3,103,663
THREE-DIMENSIONAL DIRECTION FINDER FOR AIRCRAFT GUIDANCE
Filed Aug. 23, 1961   2 Sheets-Sheet 1

INVENTOR
Louis W. Parker

BY

ATTORNEYS

Sept. 10, 1963 L. W. PARKER 3,103,663
THREE-DIMENSIONAL DIRECTION FINDER FOR AIRCRAFT GUIDANCE
Filed Aug. 23, 1961 2 Sheets-Sheet 2

INVENTOR
Louis W. Parker
BY
ATTORNEYS

United States Patent Office 3,103,663
Patented Sept. 10, 1963

3,103,663
THREE-DIMENSIONAL DIRECTION FINDER
FOR AIRCRAFT GUIDANCE
Louis W. Parker, 375 Fairfield Ave., Stamford, Conn.
Filed Aug. 23, 1961, Ser. No. 133,390
20 Claims. (Cl. 343—108)

The present invention relates to aircraft guidance structures of the type adapted to give an aircraft an indication of its position in relation to a remote point on the ground, particularly a landing location; and is more particularly concerned with a system of the type described which employs a low frequency band not used for such purposes heretofore.

The instant application comprises a continuation-in-part of my prior copending application Serial No. 708,516, filed January 13, 1958, for: "Remote Position Indicator and Aircraft Guidance System," now U.S. Patent No. 3,048,841, issued August 7, 1962.

Aircraft landing systems, of the types presently employed to facilitate guidance of an aircraft toward a landing location and blind landing thereof, primarily employ three devices as integral parts of such a system. One of these devices normally provides "left-right" information for guiding the aircraft laterally; the second such device normally indicates the altitude of the craft above the ground or landing location; and the third such device normally gives information relating to fixed points on the glide path. By reason of the information thus provided, aircraft guidance and landing systems of the types suggested heretofore are normally rather complex and costly to install and maintain. The present invention is directed to a system adapted to accomplish all of the operations described and typical of landing systems presently employed, and to do so while using only one transmitter on land and one receiver in the aircraft, associated with a simple but highly intelligible indicating structure on said aircraft.

In particular, the present invention is concerned with the provision of a blind landing system or aircraft guidance arrangement employing transmitting means at a ground location taking the form of a coil energized by an electric current of sawtooth waveform and producing a radiation and/or induction field having a particular characteristic resulting from the type of energization thus employed. This radiation and/or induction field is in turn adapted to be intercepted by receiving means carried on the aircraft, comprising in its preferred embodiment a pair of orthogonally disposed coils preferably positionally maintained with respect to the horizontal; and adapted to energize a cathode ray tube indicator acting as the primary guidance indicator for the pilot. Due to the novel form of energization employed at the landing location, and due further to the effect of the transmitted field thus produced on the receiving mechanism at the aircraft, a novel indication is produced on the aforementioned cathode ray tube indicator, characterized by a single luminous spot when the aircraft is on a proper flight path, and characterized further by a luminous line emanating from said spot indicative of the direction toward which the aircraft should be maneuvered when the aircraft deviates from the desired flight path. The indication thus produced can be employed in cooperation with other information provided by the receiving mechanism to give a highly descriptive form of aircraft guidance information by means of a structure which is simple to install and maintain.

It is accordingly an object of the present invention to provide an improved aircraft guidance system which employs a single transmitter on land, a single receiver in the aircraft, and simple indicating means.

Another object of the present invention resides in the provision of an improved remote position indicating device for use in aircraft guidance and tracking, which indicator is accurate, simple, and automatic in operation.

Still another object of the present invention resides in the provision of an aircraft landing system adapted to employ low radio or audio frequencies in order not to interfere with other radio devices present on the aircraft.

Still another object of the present invention resides in the provision of a remote position indicator adapted to guide an aircraft toward a landing location and capable of operating with a smaller frequency band width than has been possible heretofore.

A still further object of the present invention resides in the provision of an improved aircraft guidance system which gives three-dimensional information related to the position of an aircraft relative to a landing location, and which provides such information in simple and highly intelligible form.

Still another purpose of the present invention resides in the provision of an aircraft guidance and direction finder system so arranged as to increase the sensitivity and accuracy of indication as the aircraft comes closer to a landing location.

In accomplishing the foregoing objects and advantages, the present invention contemplates the provision of a remote position indicator for an aircraft taking the form of a transmitting coil preferably fixed in position at a landing location at or just below ground level and adapted to cooperate with a pair of orthogonally disposed receiving coils which are in turn located on an aircraft being guided. The receiving coils, as will appear hereinafter, are preferably coupled to the opposed deflection plates of a cathode ray tube indicator whereby any voltages induced in said receiving coils tend to so deflect the cathode ray beam as to give an indication of the relative magnitudes of said voltages induced in said receiving coils. The transmitting coil in turn is energized by a substantially sawtooth wave shaped current source; and, as will become apparent from the subsequent description, this particular waveform of energization, when applied to the transmitting coil, induces such voltages into the receiving coils as to give a positive sense indication of the angular position of the transmitting coil relative to the receiving coils. As a result, when the angular position of the transmitting coil relative to the receiving coils changes, due to relative movement between said transmitting and receiving coils, this change in relative angular position is interpreted by a change in the cathode ray tube indication.

The type of energization employed ultimately results in the cathode ray tube indication taking the form of a single bright spot when the receiving coils are disposed at a particular angle relative to the transmitting coil, and said indication further takes the form of a bright line emanating from said central spot when the angular position between said transmitting and receiving coils departs from said particular angle. Moreover, as will appear hereinafter, the orientation of said bright line, when it appears on the face of the cathode ray tube indicator, can occur in any direction through 360° depending solely upon the particular angular deviation of the receiving and transmitting coils relative to one another; and as a result, when such a bright line appears on the cathode ray tube indicator, it not only indicates that the aircraft has deviated from the desired flight path, but simultaneously gives information relating to how the aircraft should be maneuvered up or down, right or left, to return the aircraft to the desired flight path. In addition, as will appear hereinafter, the system of the present invention is so arranged that the airborne position finding equipment, in addition to noting deviations from a desired flight path, can utilize the same transmitted field to determine the distance of the aircraft from point to landing.

The foregoing objects, advantages, construction and operation of the present invention will become more readily apparent from the following description and accompanying drawings, in which:

FIGURE 4 represents an improved system of the type shown in FIGURE 1, comprising a preferred embodiment of the present invention.

FIGURE 4A illustrates the indication on the cathode ray tube.

FIGURE 5 diagrammatically illustrates the lines of force which are generated by the transmitting portion of the present invention.

FIGURE 6 illustrates a distance and height indicator scale such as may be employed in conjunction with the cathode ray tube indicator of the present invention; and FIGURE 7 illustrates a preferred flight path such as may be used in conjunction with the system of FIGURE 4.

Figure 1:
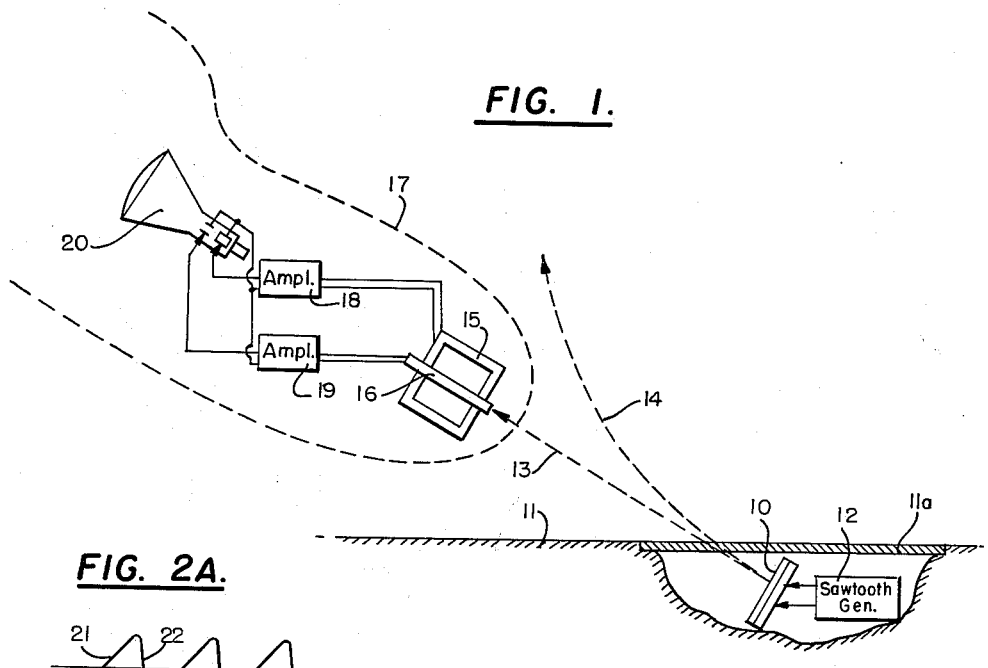
FIGURE 1 is a schematic diagram illustrating a simplified direction finder and aircraft guidance system constructed in accordance with the present invention.

Referring first to FIGURE 1, it will be seen that, in accordance with a simple form of the present invention, a three-dimensional direction finder and aircraft guidance system may comprise a ground coil 10 located at a stationary fixed position just below ground level 11 near the middle of a landing runway, preferably covered e.g. by wooden boards 11a, and disposed in a plane slightly inclined to vertical. On FIGURE 1 this deviation from vertical is greatly exaggerated to simplify observation. Ground coil 10 is energized by a sawtooth wave shape current generator 12, and is as a result adapted to produce lines of force, two of which have been shown at 13 and 14. The field so produced is adapted to be intercepted by a pair of orthogonally disposed receiving coils 15 and 16 carried by an aircraft, symbolically illustrated at 17, and coupled respectively via amplifiers 18 and 19 to the opposed deflection plates of a cathode ray tube indicator 20 on said aircraft 17.

Disregarding for the moment the type of energization provided by sawtooth wave shape current generator 12, let us initially assume that a general form of alternating current such as a sinewave shape is supplied to transmitting loop 10 by said generator 12. As is illustrated in FIGURE 1, the center line of ground or transmitting loop 10 coincides with the planes of receiving loops 15 and 16 so long as these receiving loops are positioned as illustrated, i.e. along line of force 13. Under this condition of operation, line of force 13 induces no voltage in either of receiving loops 15 or 16, and the only indication on cathode ray tube 20 is a bright spot at the middle of the screen.

If the aircraft 17 should deviate from line of force 13 by turning up or down, or sidewise, even a small amount, one or the other, or both, of said receiving loops 15 and 16 will have an A.C. potential generated therein; and the actual amount of voltage thus generated in loops 15 and/or 16 will depend partly upon the relative position of said loops 15 and 16 with respect to the plane of ground loop 10. After proper amplification, the A.C. voltages thus generated in loops 15 and 16 can be applied via amplifiers 18 and 19 to the deflection plates in cathode ray tube 20, resulting in the formation of a luminous line on the screen of tube 20.

The direction of the luminous line would, in the circumstances initially assumed, be such as to point both toward and away from the direction of line of force 13 which created the A.C. potential in the loop 15 and/or 16, i.e. the luminous indication on the screen of tube 20 would be bidirectional with respect to the center of the screen. It will be appreciated that the reason for the two opposite directions of indication thus produced on the cathode ray tube screen is that an A.C. energization of ground loop 10, if substantially sinusoidal in form, causes voltages to be produced in coils 15 and/or 16 in equal amounts both above and below an arbitrary zero line, thereby resulting in similar deflection of the cathode ray beam both above and below its zero line in equal amounts.

To overcome this undesired bidirectional indication, a sawtooth waveform of energization is preferably employed for ground coil 10. When such a sawtooth wave current is applied to coil 10, a waveform is produced in the receiving loops 15 and/or 16 which actually comprises the differential of the transmitted sawtooth waveform. The resulting output of said receiving coil 15 and/or 16 accordingly takes the form of successive pulses of opposite polarity and different amplitudes and durations, i.e. a relatively low potential of relatively long duration while the sawtooth is on its slowly changing portion, followed by an opposite polarity pulse of higher potential and shorter duration while the sawtooth is on its rapidly changing portion. By reason of the unique sawtooth form of ground energization and the particular voltages which are, as a result, induced in receiving coils 15 and 16, the aforementioned bidirectional indication is eliminated; and the resulting indication on the screen of cathode ray tube 20, when the aircraft deviates from a desired flight path, takes the form of a substantially unidirectional luminous line pointing in the direction toward which the aircraft should be maneuvered to follow the said desired flight path.

Figure 2A:
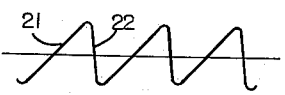
FIGURES 2A and 2B are waveform diagrams illustrating the operation of certain portions of the circuit shown in FIGURE 1.

In order that the foregoing may be more clearly understood, reference will now be made to FIGURES 2 and 3. When transmitting coil 10 is energized by a sawtooth waveform, the sawtooth shaped current circulating through said coil 10 will in turn cause a field, also of a sawtooth shaped nature, to be produced; and the said field produced by transmitting coil 10 will expand and collapse substantially in accordance with the sawtooth wave shaped energization applied to coil 10. This type of expansion and collapse of the field characterizes both the induction and radiation fields produced by coil 10; and in particular, the field of coil 10 will tend to expand rather slowly (as at 21 in FIGURE 2A) and will thereafter tend to collapse rapidly (as at 22 in FIGURE 2A). This slow expansion and rapid collapse of the field will, moreover, be repeated cyclically, at a frequency determined by the repetition rate of source 12.

The slowly expanding field produced by portion 21 of the sawtooth current energization will induce a relatively small steady state voltage 24 (see FIGURE 2B) in a receiving coil the plane of which is disposed at an angle other than 90° to the plane of coil 10; and the rapidly collapsing portion 22 of the transmitted sawtooth field will thereafter induce a relatively large voltage pulse 25, of opposite polarity to voltage portion 24, in such a receiving coil. The waveform of voltage induced in the receiving coil therefore departs from a sawtooth wave, and is actually modified to assume the configuration shown in FIGURE 2B. This induced waveform is characterized by a succession of voltage pulses having a relatively large magnitude and short duration in one direction, interspersed with other voltage pulses of smaller magnitude and longer duration in the other direction.

Figure 2B:
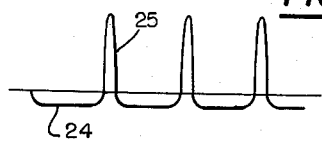

A voltage of the type shown in FIGURE 2B is, for reasons discussed above, produced in coil 15 and/or coil 16 when either of said coils deviates from the precise position shown in FIGURE 1; and the voltages thereby produced are, as already mentioned, applied to the deflection plates of cathode ray tube 20. Since no D.C. reference level is present, the A.C. zero base line is selected to be the undeflected cathode ray beam spot of the cathode ray tube, positioned at the center of the cathode ray tube screen. Application of the amplified voltage waveform shown in FIGURE 2B to the deflection plates of cathode ray tube 20 will therefore cause a pattern, illustrated at 26 of FIGURES 4 and 4A to appear on the face of the cathode ray tube; and this pattern is characterized by a relatively long sweep in one direction (produced by pulses 25) and a much shorter sweep of higher brightness in the opposite direction (produced by the pulse portions 24).

Summarizing therefore, it will be seen that in the absence of a received waveform, the display on the face of the cathode ray tube 20 will take the form of a spot located in the center of the screen; and this spot will appear so long as both of coils 15 and 16 assume the position shown in FIGURE 1. When receiving coils 15 and 16 deviate from the position shown in FIGURE 1, however, a display will be produced on the face of cathode ray tube 20 comprising an elongated line 26 pointing in a particular direction related to the direction of deviation. It is assumed that both the transmitting and receiving coils are balanced to ground as is customarily done with radio direction finders.

To further explain the foregoing operation, let us assume that the aircraft 17 turns slightly to the left, i.e. away from the plane of the paper. Line of force 13 will, under such conditions, pass through loop 15, but loop 16 will still be faced edgewise to said line of force 13 and will have no voltage induced therein. Due to the deviation in the plane of loop 15 relative to line of force 13, however, a voltage of the type shown in FIGURE 2B will be generated therein; and the output of loop 15, coupled via amplifier 18 to the deflection plate of cathode ray tube 20, will result in the formation of a display on the screen of said tube 20 comprising a line pointing to the right. This direction of the line can be easily achieved of course by giving proper attention to the interconnection between the cathode ray tube deflection plates and coil 15 (and 16, for vertical deviations). When such a line pointing to the right is produced, it in effect comprises a luminous line pointing in the direction to which the aircraft should be turned; and accordingly, the aircraft pilot can, by turning the craft to the right, cause such a linear indication to successively reduce in length until it returns to the single spot indication previously mentioned.

In a similar manner, if the aircraft should turn up or down, voltages of the types described will be induced in coil 16; and an appropriate indication of the actual direction in which the craft is to be turned will again appear on the face of cathode ray tube 20. If both vertical and lateral motions are performed simultaneously, voltages will be induced in both of coils 15 and 16; and the combined action of both sets of deflection plates in cathode ray tube 20 will cause a resultant line to be formed on the screen at an appropriate angle to indicate just how the pilot should maneuver the craft to return to the desired flight path.

From a psychological point of view, the form of indication where the direction of the line indicates the desired direction to eliminate deviation has been found to have a marked advantage. It is easy for the pilot to recognize the type of information being given if he merely assumes that there is a luminous cord connecting the point in the middle of his viewing screen with the point of landing on the ground. When the pilot is directly in line with such an assumed cord, he only sees the end thereof, i.e. a bright spot in the middle of the screen. Turning in any direction exposes more or less of the side of this assumed bright cord; and the more he has turned, the longer the cord seems. An inborne sense of direction thus enables even an untrained person to navigate the aircraft down along the imaginary luminous cord.

This guidance system exhibits an accuracy of indication that increases as the distance between the receiving coils and the transmitting coil is reduced. For example, when the aircraft is at a great distance from the transmitting coil, the amplitude of the received signal will be small and therefore a large turn off the guidance line will produce a small indicating line on the cathode ray tube. As the aircraft moves closer to the transmitting coil, the signal received will have greater amplitude; and a small turn off the guidance line will produce a long line indication on the cathode ray tube.

Line of force 13, it will be appreciated, actually comprises one of the lines of force of the magnetic field generated by transmitting coil 10; and as a practical matter there are a substantially infinite number of lines of force emanating from transmitting coil 10 in all directions. One such additional line of force has been illustrated at 14. If the aircraft should pick up and follow any of these lines of force transmitted by coil 10, the aircraft will, of course, always end up at the position of coil 10. Thus, so long as the pilot of the aircraft maintains a center spot on cathode ray tube 20, he can always be assured of arriving at a particular destination. As a practical matter, however, and particularly when the system of FIGURE 1 is to be employed for landing guidance, some of the lines of force transmitted by coil 10 may require a too rapid descent. For this reason, therefore, the aircraft 17 should be at a fairly low altitude before commencing the guidance described, and attention must be paid to the angle that the aircraft forms with the horizontal during the landing procedure. If the angle of approach is too steep, it indicates that the aircraft is too close to the transmitter coil 10 to negotiate a safe landing, and under such circumstances, it would be preferable for the aircraft to commence another approach along another line having a less steep angle. By noting the approximate altitude and angle of the aircraft to the horizontal, however, the pilot can always have a relatively accurate idea of his position in relation to transmitter coil 10. And so long as the altitude and angle of approach are proper for landing, the system employed in FIGURE 1 can be directly utilized to give accurate guidance information during the landing procedure.

It should further be noted that, while it has been assumed that the receiving coils 15 and 16 are within the induction field of transmitting coil 10, such operation is not mandatory. The coil 10 can be energized at various frequencies including frequencies as low as 60 cycles; but can also be energized at much higher frequencies. A higher frequency such as 50 kilocycles, with a properly phased 100 kc. harmonic, will allow the system to operate equally well on the radiation field of the transmitting coil several miles away. In such case, the radiation field will be at zero in the center line normal to the face of the coil. This will cause no difficulty in the direction indication since, by design, there should be a point indicated in the middle of the cathode ray tube on this line. The off-course indication will be as described previously. However, any distance measuring device which may be employed (e.g., 36, to be described hereinafter in reference to FIGURE 4) will show no indication until the induction field is picked up.

Figure 3A:
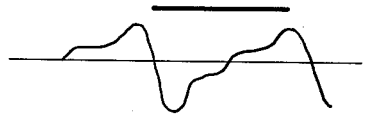
FIGURE 3A is a waveform diagram illustrating the waveform generated by the circuit of FIGURE 3.
Figure 3:
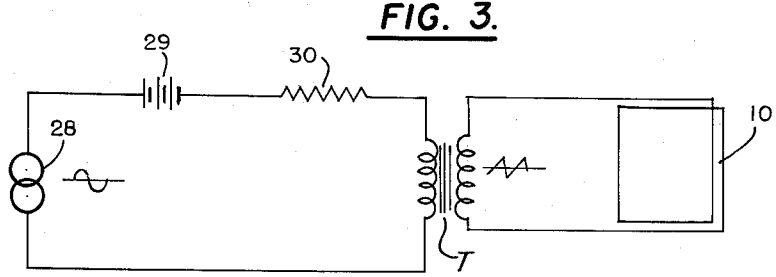
FIGURE 3 is a schematic diagram illustrating one possible circuit which may be employed in the production of a substantially sawtooth waveform energization current in accordance with the present invention.

Various forms of sawtooth generators, in themselves well known in the art, can be employed for generator 12. One simple form of generator which has been found to operate quite well is illustrated in FIGURE 3; and this particular form of generator comprises a sinewave source 28 connected in series with a D.C. source 29, and with a current limiting resistor 30 in series with the primary winding of a transformer T. Transformer T includes a core of saturable material which is adapted to saturate fairly easily, and the D.C. source 29 is provided to effect a saturation current through the primary winding of said transformer T. It will be appreciated, of course, that the said source 29 may, if desired, be coupled to the secondary coil or to a separate saturating winding on the core of transformer T rather than in series with source 28. In any event, as a result of the saturation effected by D.C. source 29, one-half cycle of the magnetic field produced in the secondary winding of transformer T, upon application of the sinusoidal voltage from source 28, is partially suppressed, thereby producing an output waveform across the transformer secondary having an even harmonic content. This particular output waveform is illustrated in FIGURE 3A and resembles a sawtooth wave whereby the said waveform may, as illustrated in FIGURE 3, be applied to the transmitting coil 10 to effect the operation already described in reference to FIGURES 1 and 2.

The simple form of the invention thus far described in reference to FIGURE 1 has the short-coming that the line or luminous cord on the screen of cathode ray tube 20 is not only affected by the position of the aircraft above the landing field, but also is affected by changes in the attitude of the plane, e.g. by the nose of the plane rising or dropping. It is also desirable to decide in advance the angle of the path to the horizontal on which the plane is to descend, usually a small angle such as four degrees, in order to avoid the too steep descent and necessary reapproaches already described. For these reasons, it is preferable to mount the receiving loops 15 and 16 in gimbals in the aircraft instead of in some arbitrary fixed position; and such a mounting is shown in the embodiment of FIGURE 4.

Referring to FIGURE 4, it will be seen that, for reasons already described, it is preferable to maintain the plane of loop 16a which supplies the vertical indication at some definite angle, e.g. four degrees to the horizontal, regardless of the attitude of the aircraft. With such an angular inclination of loop 16a, the only way to produce a point in the middle of the screen of cathode ray tube 20 is by using a line of force in space which is itself inclined four degrees to horizontal. Above or below this line there will be an indication directing the pilot to make a correction in the altitude of the aircraft, wherefore the craft will tend to approach along a flight path inclined to horizontal by the inclination of loop 16a, e.g. approximately four degrees. This particular predetermined glide path or flight path has been illustrated in FIGURE 7.

In order to effect an operation of this type, the arrangement of FIGURE 1 may be modified as shown in FIGURE 4 to incorporate a servo mechanism symbolically shown at 31a—31b and operating from a gyroscope 40 to keep loop 16a at the proper angle above horizontal regardless of the attitude of the aircraft; and the angle of the plane of loop 16a is, for reasons mentioned, preferably preadjusted to something in the order of four degrees. The unit 31a represents the transmitting portion of the servomechanism whereas the unit 31b represents the receiving portion of said servomechanism; and said servomechanism 31a—31b may be energized by a power supply 41 in accordance with conventional techniques. Gyroscopes and servo mechanisms capable of use for maintaining various equipments in fixed position are in themselves well known in the art; and accordingly the gyroscope 40 and servo mechanism 31a—31b (as well as servomechanism 33a—33b, to be described) are shown only diagrammatically in FIGURE 4. The servomechanism receiver 31b is mounted on a journal adapted to produce angular motion of loop 16a around center point 32 whenever the aircraft's nose turns up or down.

Loop 15a, serving to supply lateral guidance, need not be moved so long as the aircraft is heading into the wind in landing, such as for example in landing on an aircraft carrier. However, if there is a considerable cross wind, the nose of the aircraft will tend to be turned slightly into this cross wind, creating a lateral indication; and if this lateral indication is not compensated for, the aircraft will tend to come into the landing strip or runway at a slight angle thereto. This will, under some circumstances, be of little importance, e.g. if the cross wind effect is not too appreciable, the resulting angular inclination of the craft would matter little or not at all since the aircraft would still touch ground in front of the transmitting loop 10 although not exactly on the center of the runway. However, by knowing the landing velocity of the aircraft as well as the cross wind component, it is possible to correct for the cross wind by any of several methods. One of these is to inform the pilot from the ground to turn his lateral guidance loop 15a certain number of degrees right or left to compensate for his aircraft's turning into the wind. Another such method of compensation would be for the transmitting loop on the ground to be corrected in position so as to take into account an existing cross wind component; and this may be done automatically by constantly measuring the cross wind component at the ground location and thereafter turning the transmitting loop in an opposite direction a predetermined amount by an appropriate servo mechanism. The second method, i.e. adjustment of the ground loop, while it may look simpler from the pilot's standpoint, has the disadvantage that the aircraft is not guided by the center line of force from the ground loop, which is nearly a perfectly straight line, but by another line alongside the loop center which may be slightly curved. However, such an imperfection can be readily tolerated depending mainly on the degree of the imperfection.

In the particular system shown in FIGURE 4, means are provided for adjusting the lateral guidance loop 15a and for maintaining this adjustment in order to compensate for lateral wind drift or cross wind effects. In particular, the aircraft may be guided, by well known radio range and marker beacons, to a fairly accurately determined point in space whereafter the glide path instrumentation can take over. The field pattern of the marker beacon is shown at an area 37 on FIGURE 5, with the marker beacon disposed at the entrance to the glide path. At this area 37 the lateral guidance loop 15a can be adjusted, e.g. manually, so that its plane is directly in line with a particular line of force emanating from the transmitting loop 10 on the ground, i.e. adjusted until a zero horizontal indication is obtained. After this initial adjustment, the loop 15a can be maintained in the same relative position to transmitting loop 10 by the gyroscope 40 operating a servo mechanism 33a—33b, energized by a power supply 42, and comprising a transmitter 33a, as well as a receiver 33b connected as shown to a journal on which lateral guidance loop 15a is mounted. Such adjustment of the lateral guidance loop 15a is made at a substantial distance from the transmitting loop 10. As particularly illustrated in FIGURE 5, at such a substantial distance all of the lines of force 10a can be considered as substantially parallel to one another. Once the aircraft approaches to a distance wherein the lines of force do not exhibit such parallelism, i.e. wherein plural lines of different curvature such as 10b, 10c, etc., can be detected, the adjustment in the loop positions assures that a particular line of force is selected for guidance into the landing location. Indeed, by maintaining both of loops 15a and 16a in particular orientations through the use of gyroscopic means, as described, a nearly perfect indication of the aircraft's position in space in relation to the transmitting loop can be achieved and maintained through the entire approach.

In order to provide full information necessary to effect a safe landing under all conditions, it is also desirable to know the distance of the aircraft from the transmitting loop 10; and an indication of this information can be obtained by measuring the strength of the induction field. If relatively low frequencies are used for energizing ground coil 10, e.g. frequencies in the order of ten kilocycles, the induction field drops as the cube of the distance between the transmitting and receiving coils. This variation in field strength can therefore be used to given an indication of the distance of the aircraft from the transmitting loop.

In particular, in the arrangement of FIGURE 4, a further loop 34 is provided and is positioned at right angles to both of receiving loops 15a and 16a. As a result, loop 34 receives a relatively strong signal when the aircraft is headed anywhere near its proper direction toward ground loop 10. Loop 34 feeds an amplifier 35, the output of which in turn controls a distance and height indicator 36. In addition, the output of amplifier 35 may be fed back via rectifier 38 to a gain control in said amplifier 35; and may be similarly coupled to gain controls in amplifiers 18a and 19a respectively, comprising the amplifiers feeding voltages from coils 15a and 16a to the deflection plates of cathode ray tube 20.

As a result, the gain of each of amplifiers 18a, 19a and 35 can be caused to vary as a function of the distance between the aircraft and ground loop 10. Actually the gain control is so selected that the signal output from the amplifiers is permitted to increase considerably with increased input; and no effort is made to maintain a constant output from the several amplifiers. However, when a change in input voltage from loop 34 in the order of 1000:1, is detected, such a change is reduced to 10:1 or less, depending on the amount of rectified voltage fed back to the several gain controlled amplifiers.

The distance and height indicator 36 can, as shown in FIGURE 6, be calibrated empirically; and this calibration will hold fairly close if the parameters remain constant at both the transmitter and receiver. Distance and height indicator 36 preferably comprises a milliammeter arranged to measure the rectified output of amplifier 35 or it may operate by measuring the plate current of amplifier 35. Such a milliammeter comprising indicator 36, can be calibrated in both distance and height since there is a definite relationship between distance and height so long as the glide path is a substantially straight line inclined to horizontal by a small predetermined angle in accordance with the arrangement of FIGURE 7.

Certain further features of the system thus described should be noted. Inasmuch as relatively low frequencies are employed, and inasmuch further as the transmitting loop 10 is, in its preferred embodiment, just below ground level, there is no mirror image to distort the field pattern. In addition, the system is such that the accuracy of the indication increases as the aircraft comes closer to landing; and this is due to the increase in the picked up signal as well as to the converging lines of force. Actually, if the aircraft does not follow the center line of force, it will still arrive very near the proper point of landing due to the convergence of the lines of force. Each time the distance from the transmitting loop halves, the signal level multiplies eight times, and in this way there is a rapid increase in signal as the aircraft comes closer to landing, which in turn improves the reading accuracy of the overall arrangement.

It should further be noted that there is a significant advantage in the use of a low frequency system employing an induction field for aircraft guidance, in that the signal disappears at greater than useful distances. In the case of a 10 kc. signal energization of the ground loop, where the fundamental wavelength is substantially 30,000 meters, the useful range may be in the order of 5,000 meters. At two to three times that distance, the signal is practically unintelligible and is below the noise level. For greater glide path length, the transmission frequency may be lowered further, e.g. to a frequency such as 5,000 cycles or lower, while still retaining the above advantages. A still lower frequency, such as 60 cycles, may also be used if desired.

In addition to very low frequencies, a much higher frequency such as 50 kc. may be used, in which case the radiated component of the field will operate at more than $\frac{1}{2}\pi$ wavelengths away; and this component will indeed carry for many miles, dropping in intensity linearly with distance. It must be remembered, however, that while all indications on the cathode ray tube will be normal using the radiated component, the distance indicator 36 operates only in range of the induction field.

While I have thus described a preferred embodiment of the present invention, many variations will be apparent to those skilled in the art. The foregoing description is accordingly meant to be illustrative only and all such variations and modifications as are in accord with the principles described, are meant to fall within the scope of the appended claims.

Having thus described my invention, I claim:

1. A remote position aircraft guidance system comprising transmitting coil means located at substantially ground level, means for energizing said transmitting coil means with a current of substantially sawtooth configuration, receiving means comprising a pair of receiving coils disposed at substantially right angles to one another on an aircraft to be guided, and cathode ray tube indicator means having a pair of deflecting means energized respectively by voltages induced in said pair of receiving coils, whereby said cathode ray tube indicator means is operative to produce a single bright spot when said aircraft and the receiving means carried thereby follow a line of force emanating from said transmitting coil means, and said cathode ray tube indicator means produces a bright line substantially originating from the position of said bright spot and pointing in the direction said aircraft is to be maneuvered when the position of said aircraft deviates from said line of force.

2. The combination of claim 1 wherein said sawtooth energizing means comprises a high frequency source coupled to said transmitting coil means, whereby the receiving means in said aircraft responds to the radiation field of said transmitting coil means when said aircraft is relatively far from said transmitting coil means, and said receiving means responds to the induction field of said transmitting coil means when said aircraft is relatively close to said transmitting coil means.

3. In an aircraft guidance system, transmitting means located at a ground position and operative to produce guidance transmission signals comprising a radiation field at a distance and an induction field relatively close to said transmitting means, said transmission signals comprising plural lines of force each of which varies in intensity in two opposite going polarities at two different variation rates respectively, and aircraft receiving means adapted to respond to both said radiation and induction fields depending upon the position of said aircraft from said transmitting means, said receiving means comprising a pair of receiving coils disposed at an angle to one another, and a cathode ray tube indicator having deflection means controlled by said receiving coils whereby said indicator produces a first characteristic visual display so long as said aircraft follows a selected one of said lines of force, and produces a second different visual display when said aircraft deviates from said selected line of force.

4. The combination of claim 3 wherein said transmitting means comprises a transmitting coil fixed in position and energized by a substantially sawtooth wave current source.

5. The combination of claim 4 wherein said pair of receiving coils are disposed at a fixed position in said aircraft at substantially right angles to one another whereby said first visual display comprises a bright spot located substantially centrally on the picture face of said cathode ray tube, and said second visual display comprises a straight line originating in substantially the center of said picture face and pointing in the direction said aircraft is to be maneuvered to return to said selected line of force.

6. In an aircraft guidance system, ground transmitting means producing a varying guidance signal comprising both a radiation field at a distance relatively far from said transmitting means and an induction field relatively close to said transmitting means, said guidance signal comprising plural lines of force originating at said transmitting means, and aircraft receiving means for guiding an aircraft along one of said lines of force to the position of said ground transmitting means, said receiving means including means responsive to both said radiation field and to said induction field, said receiving means including indicator means operative to produce a first characteristic guidance indication so long as said aircraft follows one of said lines of force, and to produce a second different guidance indication when said aircraft deviates in position from said one line of force.

7. The system of claim 1 wherein said pair of receiving coils includes one coil disposed in a preselected direction to provide vertical guidance information, and means for maintaining the orientation of said one coil in said preselected direction.

8. The arrangement of claim 1 wherein said pair of receiving coils includes a substantially vertically oriented loop providing horizontal guidance information, and means for maintaining the plane of said horizontal guidance loop in a direction pointing toward said transmitting coil means.

9. The arrangement of claim 1 wherein said pair of receiving coils includes a substantially vertically oriented coil providing horizontal guidance information, and means for adjusting the plane of said vertically oriented horizontal guidance coil to compensate for lateral wind drift effects.

10. The arrangement of claim 1 including means for adjusting the position of said transmitting coil means to compensate for cross wind effects.

11. The arrangement of claim 1 wherein said receiving means includes a further coil disposed at an angle to both of said pair of receiving coils and adapted to provide an output related to the field strength of said transmitting coil means at the position of said receiving means thereby to give an indication of the distance of said receiving means from said transmitting coil means.

12. The structure of claim 11 including means responsive to the output of said further coil for varying the magnitude of voltages impressed on said pair of deflecting means by said pair of receiving coils.

13. A remote position aircraft guidance system adapted to cooperate with an electromagnetic field of substantially sawtooth waveshape configuration transmitted from a ground location, comprising receiving means including a pair of receiving coils disposed at substantially right angles to one another on an aircraft to be guided, cathode ray tube indicator means having a pair of deflecting means, amplifier means coupling voltages induced, by said sawtooth wave shape electromagnetic field, in said pair of receiving coils to said deflecting means whereby said cathode ray tube indicator means is operative to produce a single bright spot when said aircraft and the receiving means carried thereby follow a line of force in said electromagnetic field, and said cathode ray tube indicator means produces a bright line substantially originating from the position of said bright spot and pointing in the direction said aircraft is to be maneuvered when the position of said aircraft deviates from said line of force, and means responsive to the field strength of said transmitted field at the position of said receiving means for varying the display on said cathode ray tube indicator as a function of the distance between said aircraft and the source of said transmitted field.

14. The system of claim 13 wherein said field strength responsive means comprises a further coil having its plane oriented transverse to the lines of force in said transmitted field, and means coupling the output of said further coil to said amplifier means for varying the gain of said amplifier means.

15. The system of claim 13 including positioning means for maintaining at least one of said pair of receiving coils at a particular preselected angle relative to the source of said transmitted field.

16. A remote position aircraft guidance system adapted to cooperate with transmitting coil means located at substantially ground level and energized with a current of substantially sawtooth wave shape configuration, comprising receiving means including a pair of receiving coils disposed at substantially right angles to one another on an aircraft to be guided, at least one of said coils being located at an angle to horizontal corresponding to a preselected guidance attitude for said aircraft, means for maintaining the position of said one coil at said angle whereby said one coil tends to respond to a particular line of force emanating from said transmitting coil means, and cathode ray tube indicator means having a pair of deflecting means energized respectively by voltages induced in said pair of receiving coils, whereby said cathode ray tube indicator means is operative to produce a single bright spot when said aircraft and the receiving means carried thereby follow said particular line of force emanating from said transmitting coil means, and said cathode ray tube indicator means produces a bright line substantially originating from the position of said bright spot and pointing in the direction said aircraft is to be maneuvered when the position of said aircraft deviates from said particular line of force.

17. A remote position aircraft guidance system adapted to cooperate with an electromagnetic field of substantially sawtooth configuration transmitted from a ground location, comprising receiving means including a pair of receiving coils disposed at substantially right angles to one another on an aircraft to be guided, one of said coils being disposed in a substantially horizontal plane and the other of said coils being disposed in a substantially vertical plane, means for individually supporting said coils, said supporting means including means for independently controlling the angular inclinations of said coils relative to one another and relative to horizontal and vertical respectively thereby to control the voltages induced in said coils by said sawtooth wave shape electromagnetic field, and cathode ray tube indicator means having a pair of deflecting means energized respectively by voltages induced in said pair of receiving coils, whereby said cathode ray tube indicator means is operative to produce a single bright spot when said aircraft and the receiving means carried thereby follow a line of force emanating from said transmitting coil means, and said cathode ray tube indicator means produces a bright line substantially originating from the position of said bright spot and pointing in the direction said aircraft is to be maneuvered when the position of said aircraft deviates from said line of force.

18. A remote position aircraft guidance system adapted to cooperate with transmitting coil means located at substantially ground level and energized by a current of substantially sawtooth configuration thereby to produce a sawtooth guidance field, comprising receiving means including a pair of receiving coils disposed at substantially right angles to one another on an aircraft to be guided, and cathode ray tube indicator means having a pair of deflecting means energized respectively by voltages induced in said pair of receiving coils by said sawtooth guidance field, said cathode ray tube indicator means being operative to produce a single bright spot when said aircraft and the receiving means carried thereby follow a line of force emanating from said transmitting coil means, and said cathode ray tube indicator means producing a bright line substantially originating from the position of said bright spot and indicating the direction said aircraft is to be maneuvered when the position of said aircraft deviates from said line of force.

19. The system of claim 16 wherein said means for maintaining the position of said one coil at said angle comprises a gyroscope.

20. The system of claim 18 including a gyroscope, and servomechanism means coupling said gyroscope to at least one of said receiving coils for controlling the position of said receiving coil.

No references cited.